US007895650B1

(12) United States Patent
Sobel

(10) Patent No.: US 7,895,650 B1
(45) Date of Patent: Feb. 22, 2011

(54) FILE SYSTEM BASED RISK PROFILE TRANSFER

(75) Inventor: William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 1081 days.

(21) Appl. No.: 11/014,679

(22) Filed: Dec. 15, 2004

(51) Int. Cl.
*G06F 11/00* (2006.01)
*G06F 11/30* (2006.01)
*H04L 29/06* (2006.01)

(52) U.S. Cl. .............. 726/22; 726/23; 726/24; 726/25; 713/164; 713/165; 713/166; 713/167; 713/187; 713/188

(58) Field of Classification Search ......... 713/164–167, 713/187–188; 726/22–25
See application file for complete search history.

(56) References Cited

U.S. PATENT DOCUMENTS

| 5,655,074 | A * | 8/1997 | Rauscher ................... 714/38 |
| 6,219,805 | B1 * | 4/2001 | Jones et al. ................ 714/38 |
| 6,871,277 | B1 * | 3/2005 | Keronen .................... 713/167 |
| 7,000,247 | B2 * | 2/2006 | Banzhof ..................... 726/2 |
| 7,284,244 | B1 * | 10/2007 | Sankaranarayan et al. .. 718/104 |
| 7,398,517 | B2 * | 7/2008 | Berg et al. .................. 717/126 |
| 2002/0147923 | A1 * | 10/2002 | Dotan ....................... 713/200 |
| 2003/0009408 | A1 * | 1/2003 | Korin ........................ 705/36 |
| 2003/0046128 | A1 * | 3/2003 | Heinrich ..................... 705/7 |
| 2003/0093696 | A1 * | 5/2003 | Sugimoto ................... 713/201 |
| 2003/0115511 | A1 * | 6/2003 | Kubota ...................... 714/47 |
| 2004/0006704 | A1 * | 1/2004 | Dahlstrom et al. .......... 713/200 |
| 2004/0034794 | A1 * | 2/2004 | Mayer et al. ................ 713/200 |
| 2004/0143753 | A1 * | 7/2004 | Hernacki et al. ............ 713/200 |
| 2005/0091227 | A1 * | 4/2005 | McCollum et al. .......... 707/100 |
| 2005/0193430 | A1 * | 9/2005 | Cohen et al. ................ 726/25 |
| 2005/0283834 | A1 * | 12/2005 | Hall et al. .................. 726/24 |
| 2006/0095968 | A1 * | 5/2006 | Portolani et al. ............ 726/23 |

FOREIGN PATENT DOCUMENTS

WO WO 2004/095801 A1 * 2/2004

OTHER PUBLICATIONS

Rauscher et al., "Gray Box Risk Assessment for Telecommunications Software Modifications," IEEE, 1996.*

* cited by examiner

*Primary Examiner*—Beemnet W Dada
*Assistant Examiner*—Darren Schwartz
(74) *Attorney, Agent, or Firm*—Hunton & Williams, LLP

(57) ABSTRACT

File system based risk profile transfer is disclosed. A request to access an object stored in memory is received from a requesting service, application, or other process. An object risk profile associated with the object, which profile comprises data indicating a level of risk associated with a prior service, application, or other process that previously created or modified the stored object, is accessed. The level of risk reflected in the object risk profile is factored into a process risk profile associated with the requesting service, application, or other process. A security measure to protect the requesting service, application, or other process is deployed based at least in part on the process risk profile.

28 Claims, 10 Drawing Sheets

FILE SYSTEM BASED RISK PROFILE TRANSFER

CROSS REFERENCE TO OTHER APPLICATIONS

Co-pending U.S. patent application Ser. No. 10/677,730 entitled RISK PROFILING FOR OPTIMIZING DEPLOYMENT OF SECURITY MEASURES filed Oct. 1, 2003 is incorporated herein by reference for all purposes.

FIELD OF THE INVENTION

The present invention relates generally to security software. More specifically, file system based risk profile transfer is disclosed.

BACKGROUND OF THE INVENTION

Using a risk profile associated with a service, application, and/or other process to optimize deployment of security measures is disclosed in co-pending U.S. patent application Ser. No. 10/677,730 (the '730 Application), which is incorporated by reference above. The '730 Application describes, inter alfa, calculating a risk profile for a host service based on such factors as which, if any external ports the service communicates on and, if applicable, the risk profile of services, applications, and/or other processes with which the service interacts and through which the service to be protected may be vulnerable to indirect attack, e.g., by virtue of the fact that such other services, applications, and/or processes communicate via external ports.

However, certain services, applications, or processes may be exposed to indirect attack through asynchronous interaction with objects created, modified, accessed, or otherwise affected at a prior time by another service, application, or process that has a higher level of risk associated with it. For example, a first application may be configured to generate as output a file, data, or other object that is stored in memory (e.g., in the file system, a database, and/or otherwise) by the first application, and a second application configured to access the stored object from memory at a later time, such that no direct, live connection between the first and second applications ever exists. For such asynchronous interactions, a system or process configured to monitor for live interactions and adjust the risk profile of one or the other of the applications (or services or other processes) accordingly would not observe an asynchronous interaction such as through a stored file, data, or other object. Therefore, there is a need for a way to factor risks to which a service, application, or other process may be exposed through asynchronous interaction with objects stored by another service, application, or other process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using an object risk profile to secure a host service, application, or other process is disclosed. In one embodiment, a request to access an object stored in memory is received from a requesting service, application, or other process. An object risk profile associated with the object, the object risk profile comprising data indicating a level of risk associated with a prior service, application, or other process that previously created or modified the stored object, is accessed. The level of risk reflected in the object risk profile is factored into a process risk profile associated with the requesting service, application, or other process. A security measure is deployed to protect the requesting service, application, or other process based at least in part on the process risk profile.

Figure 1:
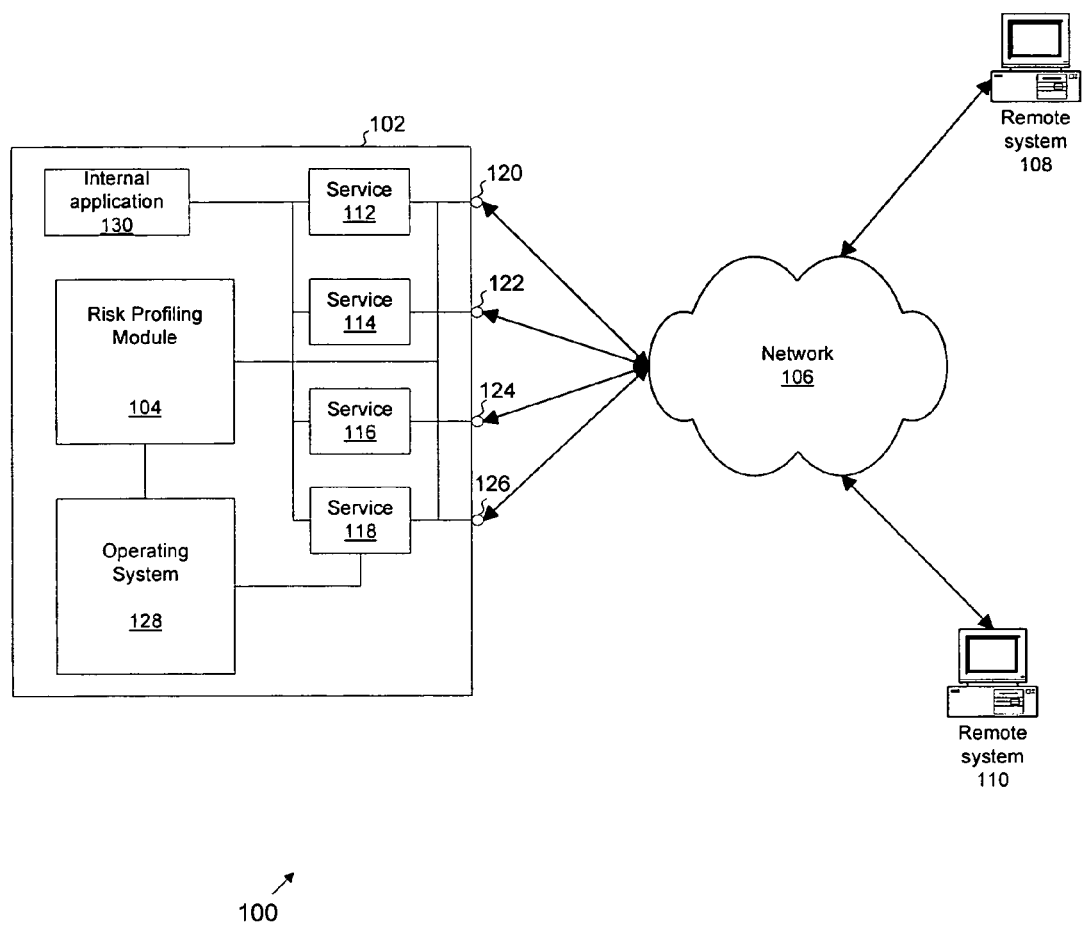
FIG. 1 is an illustration of an exemplary risk profiling system.

FIG. 1 is an illustration of an exemplary risk profiling system 100. A host 102 includes a risk profiling module 104 communicating over network 106 to remote systems 108 and 110. In this example, remote systems can include both authorized and unauthorized clients or systems that are attempting to gain access to host 102. Within host 102 are host services 112-118, communicating over ports 120-126. Host services can include applications, network services, and other programs running on a host, such as host 102. Host services can also include external applications as well as internal applications communicating through them. External applications can be host services that are in direct external communication with a remote system (e.g., client, server, host, terminal, etc.). Operating system 128 manages host services 112-118 and provides an operating platform for host 102. In this example, internal application 130 (which can be defined as a host service) is also shown, communicating over ports 120-126 using host services 112-118.

Figure 2:
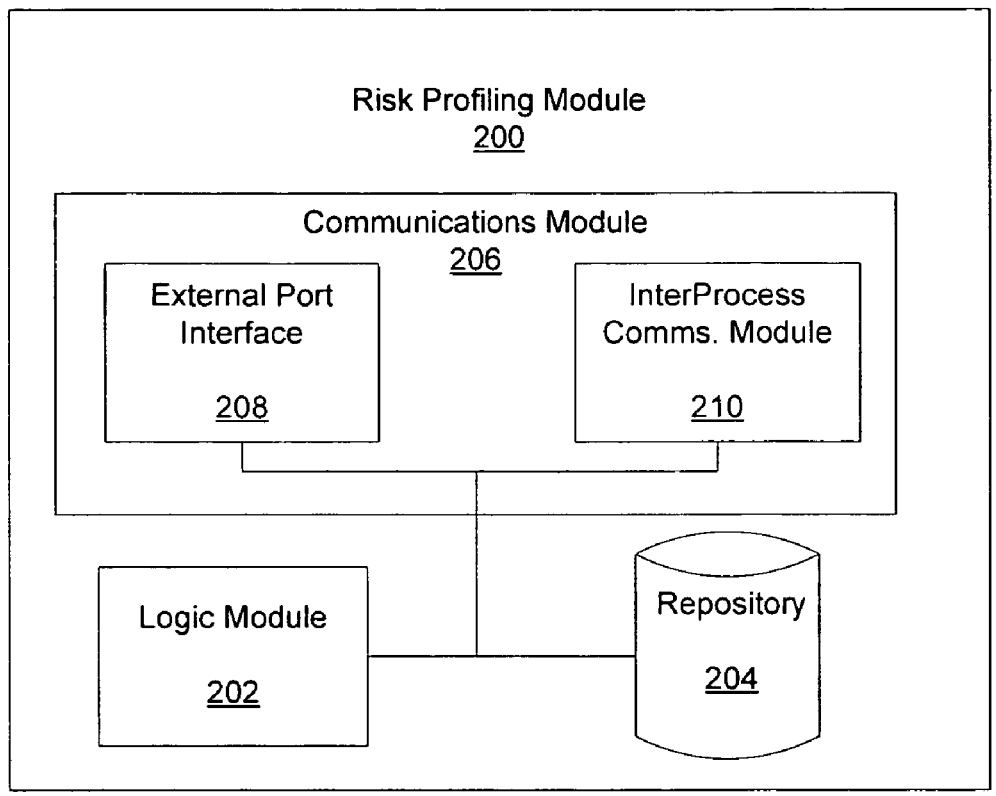
FIG. 2 is a diagram illustrating an exemplary risk profiling module.

FIG. 2 is a diagram illustrating an exemplary risk profiling module 200. Logic module 202 retrieves and stores data in repository 204. Repository 204 can be implemented using any type of database or data storage utility or facility. Communications module 206 includes external port interface module 208 and inter-process communications module 210. External port interface module 208 and inter-process communications module 210 are included within communications module 206. In this embodiment, external port interface module 208 provides an interface between communications module 206 and external applications. In other embodiments, external port interface abilities may be provided by an operating system that can be "hooked" in order to access and use relevant data. Hooking an application (e.g., an API) can include using the application to gain access, sample, retrieve, request, or use data from another application. Hooking may also include tapping into other applications to gather state information about a particular system, host, machine, etc. Host services listening on external ports use external port interface module 208, which risk profiling module 200 uses to evaluate incoming data traffic. An external application uses an external port in order to communicate a request for data or access to data/information stored on the host. The external port interface module 208 provides data related to these external requests to risk profiling module 200.

Risk profiling module 200 assesses risk using logic module 202 and data stored in repository 204. The stored data may include samples from binaries of executable files, API bit stream data, or other data packets sent by a remote system to a host. API bit stream data may include values intercepted or hooked from API calls to other systems (e.g., operating system 128). Status information from a running system may also be included in API bit stream data. It is also possible to determine system information without hooking into system processes such as calling an API or hooking operating system 128. The stored data provide indications to risk profiling module 200 of external communications, either directly or over inter-process communications. External port interface 208 can determine whether an external call or request has occurred to a host service. Incoming data packets can be sampled and stored by risk profiling module 200 using external port interface 208.

In other embodiments, these modules may be implemented apart from communications module 206. Regardless of implementation, external port interface module 208 provides samples from incoming data traffic directly to external applications (e.g., services 112-118 communicating over ports 120-126, information about which ports are being used). In some embodiments, determining that a port is being used may be as useful as determining the actual data transmitted over the port. Likewise, inter-process communications module 210 provides samples from data communications between an internal host service (i.e., internal application 130) communicating externally via an external application (i.e., services 112-118).

Risk profiling module 200 develops risk profiles host services to determine risks to host services and optimization of deployment of security measures to protect them. Security measures may include host-based behavior blocking and related hardening techniques. Risks can include remote systems conducting direct attacks on external applications or indirect attacks on internal host services using inter-process communications (e.g., attacking a common out-of-proc corn object). Inter-process communications refers to one host service indirectly communicating with an external application.

For indirect communication, inter-process communications module 210 can determine if a host service is at risk. Logic module 202 receives data from inter-process communications module 210 and can develop a profile if an internal application is communicating with an external application. In this example, logic module 202 identifies the host service and assembles a risk profile based on data it is receiving from inter-process communications module 210 and/or external port interface 208. Risk profiling module 200 can assign a security measure and store a risk profile for a particular host service.

By evaluating external ports for direct communication or calls from external applications, risk profiling module 200 creates a profile for each host service engaged in external communication. The identified host services are then protected by various types of security measures.

In inter-process communications, an internal host service (i.e., one that does not have direct access over a communications port) can exchange data with an external application in order to send or receive data from a remote system. For example, a spreadsheet application can be run on a host, but may not have external communication with another remote system or host running a similar spreadsheet. By transferring data using inter-process communications with an e-mail application, the spreadsheet application, in this example, is able to send data to a remote system. After assessing direct and indirect attack risks, risk profiling module 200 can determine what security measures should be applied to host services based on the risk profiles.

In one embodiment, inter-process communications may occur asynchronously, such as occurs when a service, application, or other process accessed a file, data, or other stored object created, accessed, modified, or interacted with otherwise by another service, application, or other process. In one embodiment, an object risk profile is associated with at least a subset of the files, data, and/or other objects stored on a system and data comprising the object risk profile is factored in to the determination of the risk profile of services, applications, and/or processes that subsequently access and/or otherwise interact with the object.

Risk profiling module 200 can categorize and prioritize host services based on user-configurable rules, performance criteria, or other factors set or selected by the user or the host. Security measures such as anti-virus, behavior blocking, vulnerability assessment, encryption, encoding, hardening, and other related techniques can be used to protect host services. Further, risk profiling module 200 can target the application of security measures to a set of host services having greater risks than others. Risk profiling can be used to determine what security measures should be applied and how they should be applied to host services. The discriminate application of security measures using risk profiles eliminates the need for large storage and processing requirements on the host. By using risk profiles of host services, the deployment of security measures can improve host performance and protection.

Figure 3A:
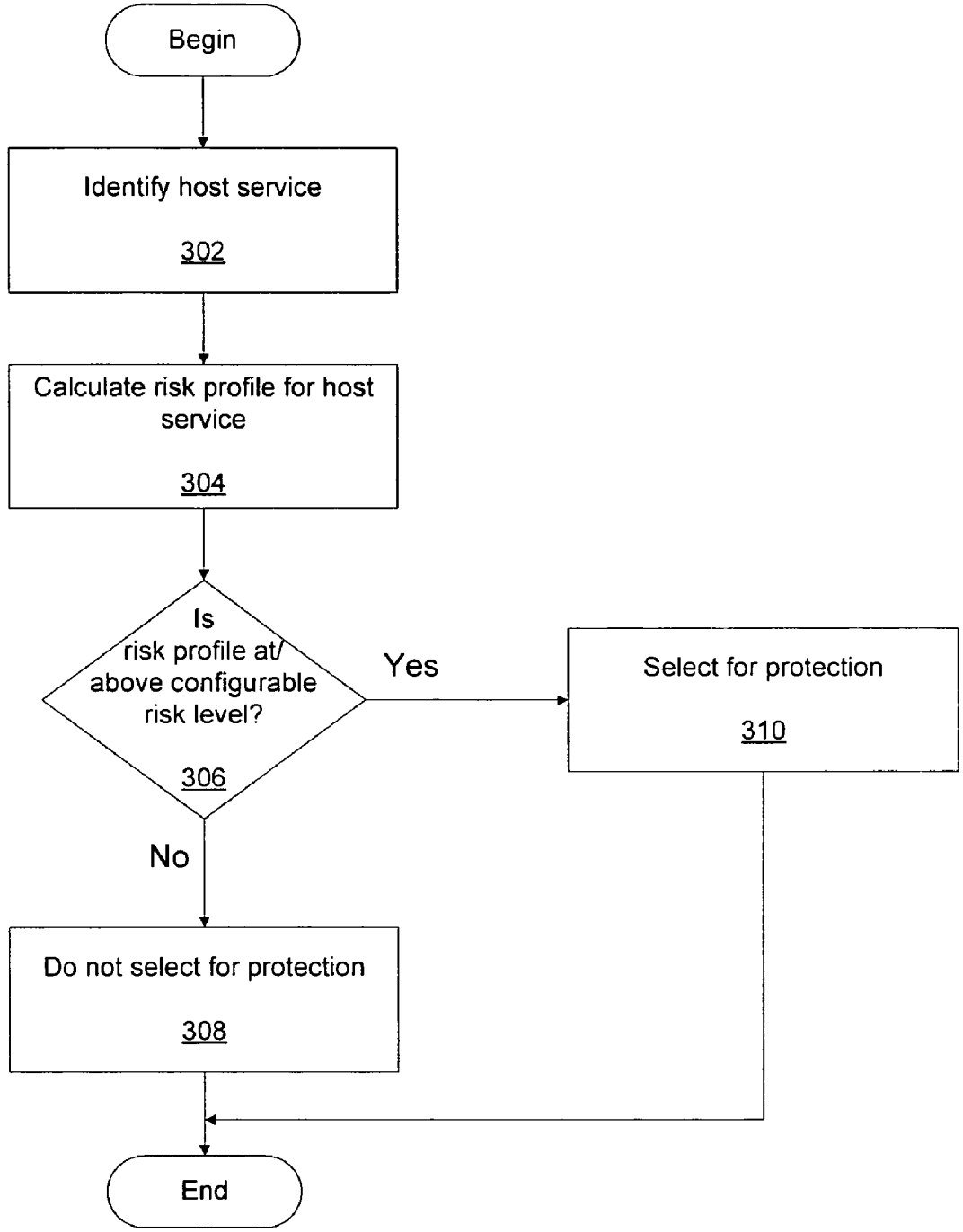
FIG. 3A illustrates an exemplary method of risk profiling a host service.

FIG. 3A illustrates an exemplary method of risk profiling a host service. Risk profiling module 200 identifies all host services (302). Once identified, a risk profile is calculated for each host service (304). The calculation of risk profiles is described in further detail in connection with FIG. 3B. Once a risk profile has been calculated, the risk profile can be compared to a configurable risk level (306). The configurable risk level can be pre-defined, user-specified, or automatically set. The purpose of a configurable risk level is to provide a baseline for the performance or risk profiling module 200. Risk profiles that do not meet or exceed the configurable risk level are often left alone, but can be selected for protection based on other criteria (308). Risk profiles that exceed the configurable risk level can be selected for security measure or protection (310).

Using risk profiles enables both the protection of host services as well as the optimization of host resources and performance while implementing security measures. A risk profile is an assessment of the type of risk and/or the level of risk associated with a process. In general, attributes of a risk profile are defined based on the host service and type of vulnerability. For example, if a particular host service is available on port 10 for 20 minutes to enable remote administration of the host operating system, then a risk profile might be high. Assigned attributes could include the period of vulnerability (20 minutes), priority for protection because the operating system is exposed (priority=high), and the port number (port=10). Thus a security measure (e.g., personal firewall software) may be implemented based on the risk profile in order to prevent an attack on the host operating system.

A risk profile can also be developed using user or system-specified rules. These configurable rules may specify particular types of host services for protection, modify or specify default priorities, or the type of security measure to be used for specific host services (e.g., suppression of OS responses to a probe or scan).

Once profiled, host services can be protected using security measures. Using risk profiles to dynamically implement a security measure for a host service provides comprehensive protection while reducing system resource and processing requirements on the host. In other words, security measures may be dynamically deployed to protect host services if and when they are needed. This reduces the burden on the host, eliminating resource requirements typically required by if simultaneously applying security measures to all host services. In order to implement security measures, a risk profile can be assembled using sample data from a variety of sources.

Risk profiling involves identifying host services that may include external applications or internal host applications engaged in inter-process communications. Some examples of inter-process communications may include services listening on local ports, RPC/out of process COM objects, shared memory, named pipes, Windows/operating system messaging, service messaging, device input/output control messaging, and other forms not specifically listed. In one embodiment, sample data can be taken from binary executable files or run-time hooking of host services via application programming interfaces (APIs). In one embodiment, inter-process communication may occur asynchronously, e.g., through interaction by one process with an object (e.g., a file, data, or some other object) stored previously by another process. In this manner, inter-process communication can occur without any observable connection being established between the two processes.

Preferably, risk profiling gathers sample data related to host service attributes. Host service attributes are detected and weighed in order to generate a risk profile. A given weight determines how much and in what order a particular host service is to be protected. By detecting or evaluating these attributes, a risk level can be determines and assigned to a risk profile. In this example, based on comparing the risk level to a configurable risk-level, security measures can be assigned an implemented.

The identification of host service attributes can be implemented using a combination of static analysis of binary executable files of the host services (e.g., examining import tables for calls to APIs related to inter-process communication), run-time hooking of host services, and/or an analysis of stored objects with which the service interacts and the identity and/or risk profile associated with the service, application, or other process that created each such object.

Run-time examination may be necessary to determine dynamically established communications and to full determine direct and indirect communications among host services. In other words, risk profiling can be performed by identifying all host services exhibiting evidence (i.e., sample data) of listening on an external port and/or hosting any type of inter-process communication, thereby assuming that external vulnerabilities to remote systems exists and, therefore, requires protective security measures.

Sample data taken in the above examples provide an indication to risk profiling module 200 that a particular host service is at risk. Risk levels can be assigned to a risk profile if a host service is communicating externally. Risk levels can also be assigned to a risk profile if a host service is listening on a port, although it is not receiving data. Probes, scans, connection requests, and other incoming data traffic provide indication that a host service is listening on an external port and vulnerable to attack. However, via hooking, it may be possible to determine whether a port is open, regardless of whether any data traffic is flowing over the port.

Figure 3B:
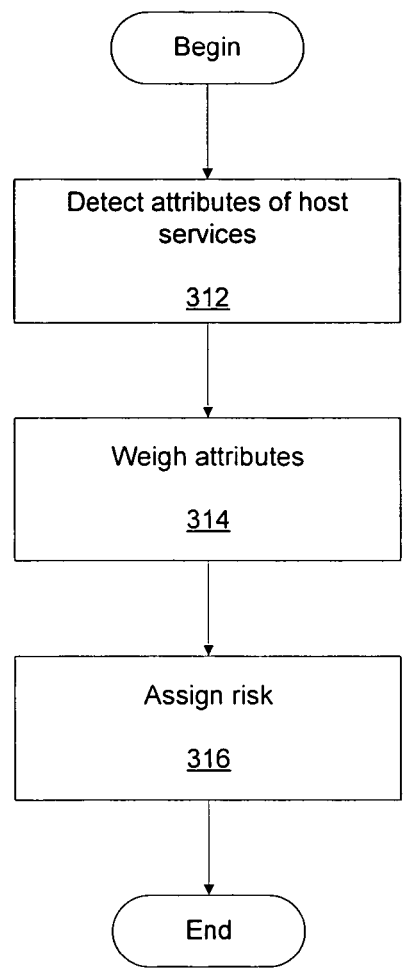
FIG. 3B illustrates an exemplary method for calculating a risk profile.

FIG. 3B illustrates an exemplary method for calculating a risk profile. Risk profiling module 200 detects attributes, as described above, for host services that may be engaged in direct external communications (e.g., external applications) or indirect external communications (e.g., synchronous or asynchronous inter-process communications) (312). Host service attributes are then analyzed and weighted (314). Once weighted, a risk level is developed and assigned to a risk profile (316). Based on the risk level, security measures can be assigned to protect the host services.

Figure 4A:
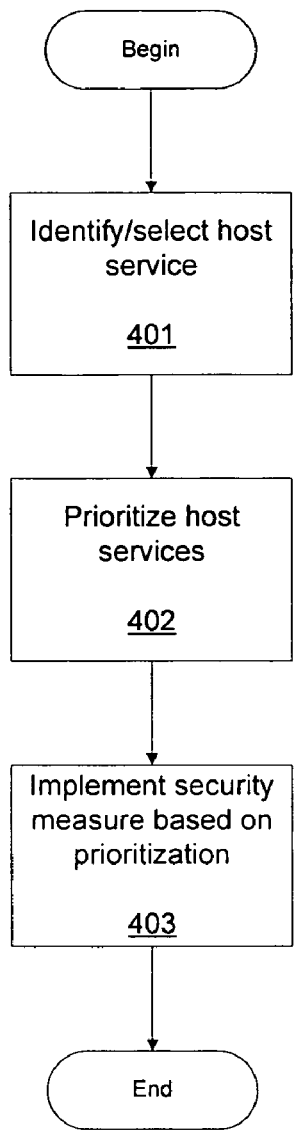
FIG. 4A is a flow chart illustrating an alternative method for risk profiling.

FIG. 4A is a flow chart illustrating an alternative method for risk profiling. Risk profiling module 200 identifies host services that are communicating with external applications (401). Host services can be prioritized based on risk profiles (402). Risk profiles take into account the type of host service engaged in external communications. If the host service is directly communicating over an external port, a security measure can be implemented (such as port stealthing or blocking). If a user configures risk profiling module 200 to prioritize host services, then a priority may be assigned to a risk profile.

In other embodiments, other factors can be taken into account when developing a risk profile. Factors such as the type of host service, the importance (to either the user or the host) of the host service, attributes such as the name of the service or data accessible to the service, and other user-specified criteria can provide default or overriding values when assembling and using risk profiles. After prioritizing host services requiring protection, security measures can be implemented, based on each risk profile (403).

Figure 4B:
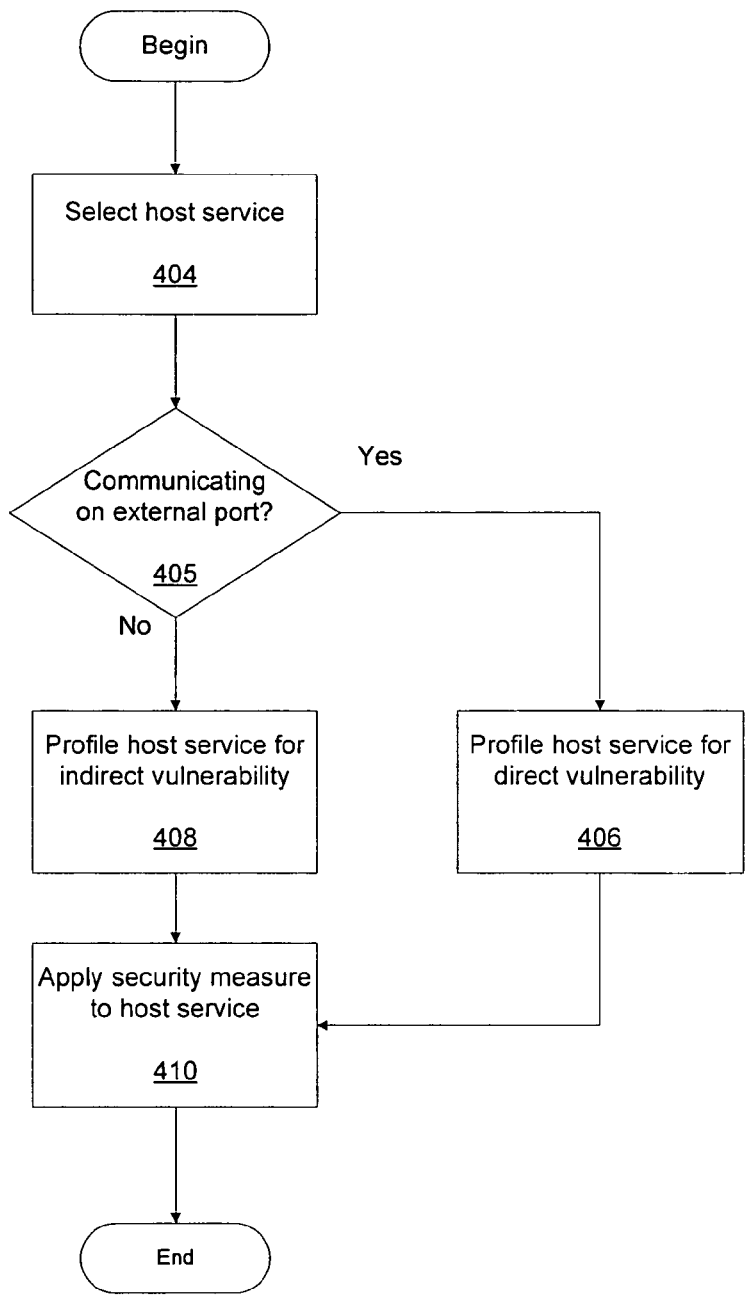
FIG. 4B is a flow chart illustrating an alternative method for risk profiling in order to optimize deployment of security measures.

FIG. 4B is a flow chart illustrating an alternative method for risk profiling in order to optimize deployment of security measures. Risk profiling module 200 (FIG. 2) selects a host service for profiling (404) and determines whether the host service is communicating over an external port (405). If the host service is communicating over an external port, then risk profiling module 200 determines a profile for a direct vulnerability (406). If risk profiling module 200 is not directly communicating over an external port, then risk profiling module 200 determines if it is communicating indirectly through one or more host services that are on an external port (either synchronously or asynchronously, e.g., through interaction with an object stored by another process) (408). Regardless of whether the profiled risk is direct or indirect, protection is applied to the host service based on the risk profile (410).

Sampled incoming data traffic may indicate a risk of attack, both direct and indirect, from a remote system or the existence of a channel, regardless of whether or not it is in use. By monitoring incoming data traffic, risk profiling module 200 can determine if a security measure should be applied. Risk profiles also aid in determining the priority of a host service when applying a security measure. As not all host services may be engaged in external communications at the same moment, security measures do not need to be applied to all host services at the same moment. Subsequently, system resources such as processor time are not over burdened by security measures, if assigned and implemented based on risk profiling as described above. Further profiling can include determining the type of specific risk and other details. In another embodiment, the same result may be achieved by monitoring APIs using integration with a monitoring routine with each API of every application.

If risk profiling module 200 determines that either sampled binaries or APIs have revealed a threat, then a priority code is assigned to the host service. Based on the priority code, security measures are invoked. Priority codes may be implemented as a tag, field, bit string, or other indicator in the repository of risk profiling module 200 in order to generate an order in which host services are protected. Other techniques for assigning priority codes are used in other embodiments.

Figure 5:
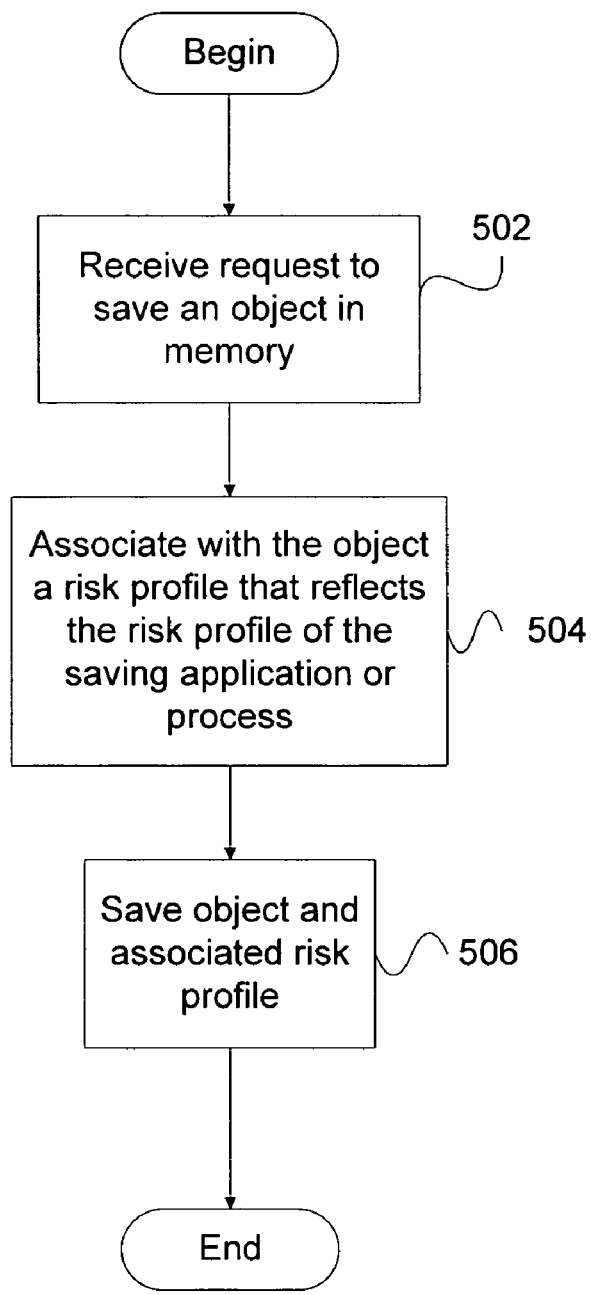
FIG. 5 is a flow chart illustrating a process used in one embodiment to associate an object risk profile with a stored object.

FIG. 5 is a flow chart illustrating a process used in one embodiment to associate an object risk profile with a stored object. In one embodiment, an agent installed on a system on which the object is to be stored is configured to implement the process of FIG. 5. A request to save an object in memory is received (502). In one embodiment, 502 is implemented by monitoring operating system calls, e.g., calls associated with a file system and/or memory. An object risk profile that reflects the risk profile of the saving service, application, or other process is associated with the object being stored (504).

In one embodiment, 504 includes determining if the object already has an object risk profile associated with it, such as might be the case if the object being saved was stored previously by another application and is currently being saved by an application that subsequently accessed and modified the object. If a preexisting object risk profile is found, the preexisting object risk profile is adjusted to reflect the level of risk associated with the application (or other process) currently saving the object. If the risk level associated with the saving application is greater than that of the application(s) and/or other process(es) that has/have created and/or accessed the object previously, the object risk profile is changed to reflect the higher level of risk. If, one the other hand, the level of risk associated with the application currently saving the object is lower or the same as that of the most risky application to have created and/or accessed the object previously, the object risk profile remains unchanged in one embodiment. In one embodiment, an audit trail of the applications and/or other processes that modify a stored object is maintained, even if the level of risk does not increase as a result of the most recent interaction with the object. If there is no preexisting object risk profile, an object risk profile is created in 504 for the object. In one embodiment, an object risk profile is created and/or updated only under prescribed circumstances. For example, in one embodiment only objects created and/or modified by a service, application, or process having a prescribed threshold level of risk associated with it, e.g., one that communicates via external ports and/or ones running as SYSTEM (a user account having special privileges on certain Microsoft™ platforms) or root (a user account having special privileges on a UNIX based system, e.g.), have an object risk profile created and/or updated for them. SYSTEM and root are examples of accounts that have associated with them a special, in some cases the highest possible, level of privileges with respect to a system, enabling a user and/or process having the associated privileges to perform sensitive operations potentially affecting the hardware or software configuration of the system, access confidential data, add users, and/or crash or otherwise tamper with or damage the system. In one embodiment, an object risk profile is created only for objects created and/or modified by an application or other process that stores a prescribed threshold number of objects within a prescribed period in the same storage area, e.g., in the same directory tree or other location, to limit the creation of object risk profiles to objects likely to have been created by applications or other processes that use stored objects to communicate data asynchronously to other applications and/or processes, which applications often store many objects in the same area. In one embodiment, the object risk profile reflects a composite or union of information of the risk profiles of all of the services, applications, and/or processes that have interacted with the object. In one embodiment, the object risk profile associates with the object the level of risk of the highest risk service, application, and/or process that has interacted with the object. In one embodiment, an audit trail of the services, applications, and processes that have interacted with the object is maintained in the object risk profile. In one embodiment, an object risk profile is created (or updated) based at least in part on a portable risk profile associated with a service, application, or process that created (or modified) the object. For example, for an SMTP daemon the portable risk profile in one embodiment comprises a data structure indicating that port 25 is open for receive and the process is running as SYSTEM. In one embodiment, a directory may have a risk profile associated with it and each of the files in the directory is assigned a risk level that reflects the risk level associated with the directory.

The object and associated object risk profile are stored (506). In one embodiment, if the object is being stored in a Microsoft Windows™ system using the NTFS file system, the object risk profile is stored as an alternate data stream associated with the file, similar to the manner in which the Windows™ operating system tags files downloaded via a network with the origin zone from which the file was downloaded. For other objects and/or operating systems, any suitable technique may be used to store object risk profiles and associate each with its corresponding object, including without limitation a database, table, linked list or any other suitable data structure or tool. In one embodiment, the object risk profile is stored in a manner that prevents tampering with the profile, e.g., by using a behavior blocking system, application, or process to prevent unauthorized access.

Figure 6:
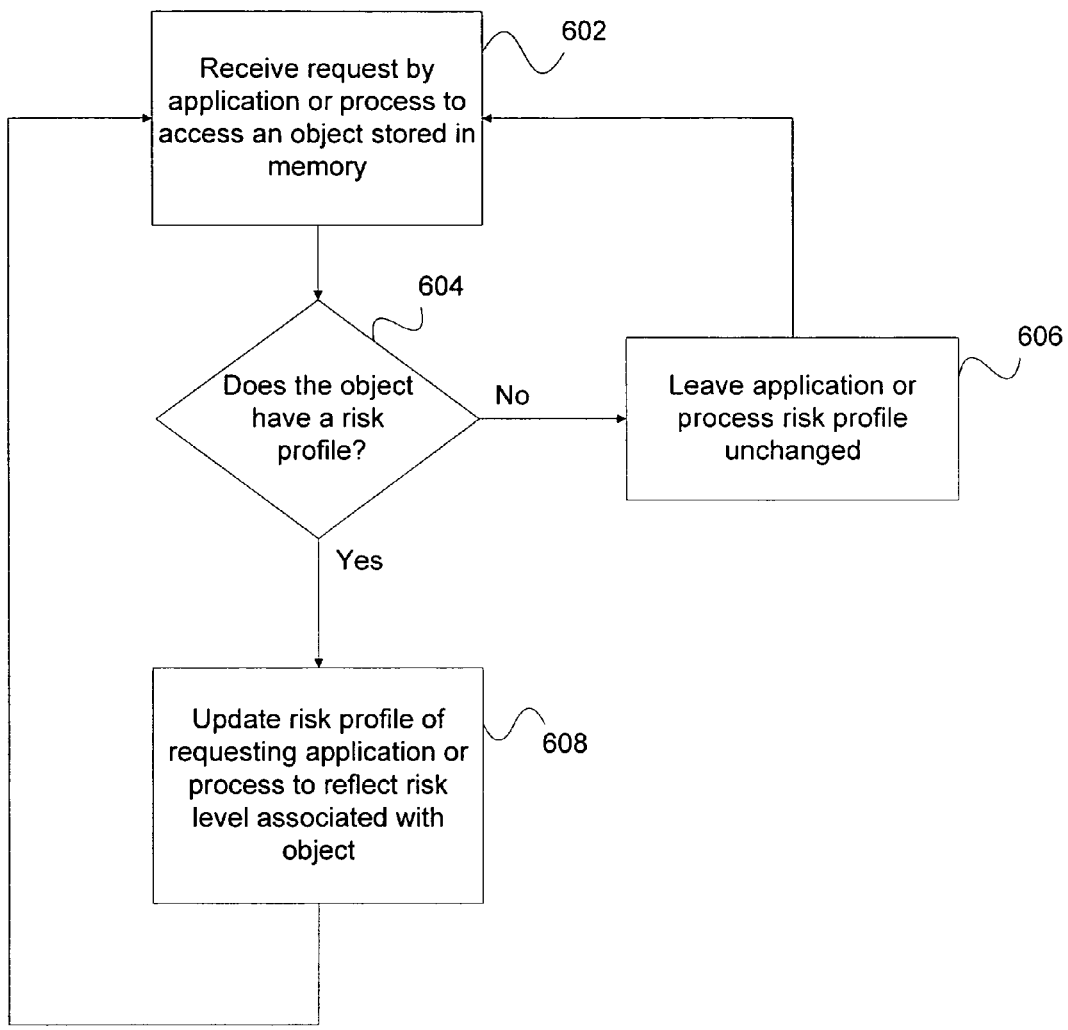
FIG. 6 is a flow chart illustrating a process used in one embodiment to update the risk profile of a service, application, or other process based on an object risk profile associated with an object the service, application, or process has accessed.

FIG. 6 is a flow chart illustrating a process used in one embodiment to update the risk profile of a service, application, or other process based on an object risk profile associated with an object the service, application, or process has accessed. A request to access an object stored in memory is received from a service, application, or other process (602). It is determined whether the object has an object risk profile associated with it (604). If not, the risk profile of the application or process is left unchanged (606). If so, the risk profile of the application or process requesting access to the object is updated to reflect the risk level associated with the requested object (608). In one embodiment, access to the object may be denied if the risk level associated with the object in its corresponding object risk profile exceeds a prescribed threshold associated with the requesting application or process.

Figure 7:
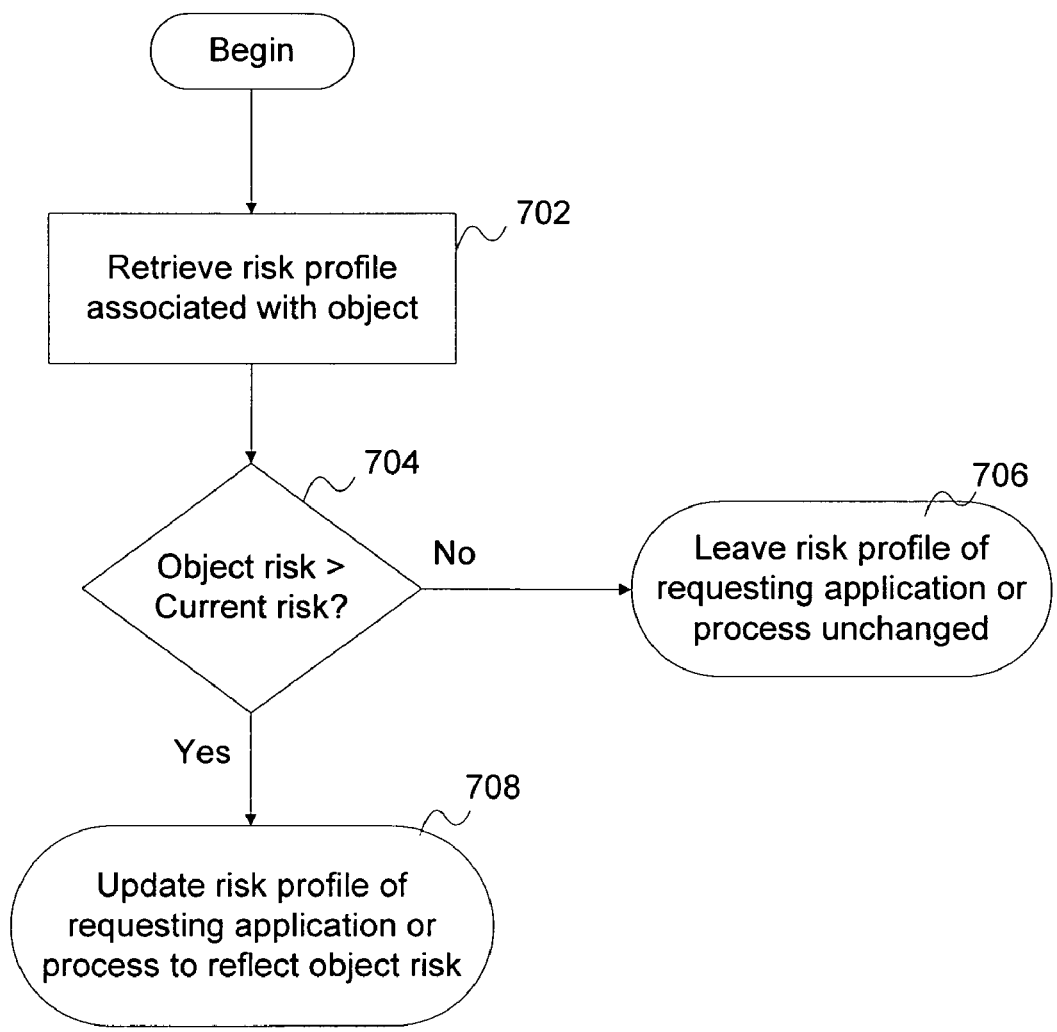
FIG. 7 is a flow chart illustrating a process used in one embodiment to update the risk profile of a requesting service, application, or other process based on an object risk profile.

FIG. 7 is a flow chart illustrating a process used in one embodiment to update the risk profile of a requesting service, application, or other process based on an object risk profile. In one embodiment, the process of FIG. 7 is used to implement 608 of FIG. 6. The object risk profile associated with the requested object is received (702). It is determined whether the risk level associated with the object is greater than the risk level currently associated with the requesting application or process (704). If not, the risk profile of the requesting application or process is left unchanged (706). If so, the risk profile of the requesting application or process is updated to reflect the higher level of risk associated with the object (708). In one embodiment, the higher level of risk associated with the object is reflect in the risk profile of the requesting application or process by substituting the risk level of the object as the risk level of the application or process. In other embodiments, a weighted or other formula may be used to reflect in the risk profile of a requesting application or process the risk level associated with an object accessed by the application or process.

In one embodiment, the risk profile of a service, application, or other process is modified dynamically, as described above in connection with FIGS. 6 and 7, e.g., and the security measures applied with respect to the service, application, or process are changed dynamically to reflect the current level of risk associated with the service, application, or process, i.e., as adjusted dynamically as the service, application, or other process interacts with stored objects. In one embodiment, a more static approach is used in which a service, application, or other process is observed during an observation or learning period to learn the objects (or types of objects) with which the service, application, or process regularly interacts. The object risk profiles associated with these objects (or classes of object) are then used to determine the risk profile of the service, application, or other process.

Figure 8:
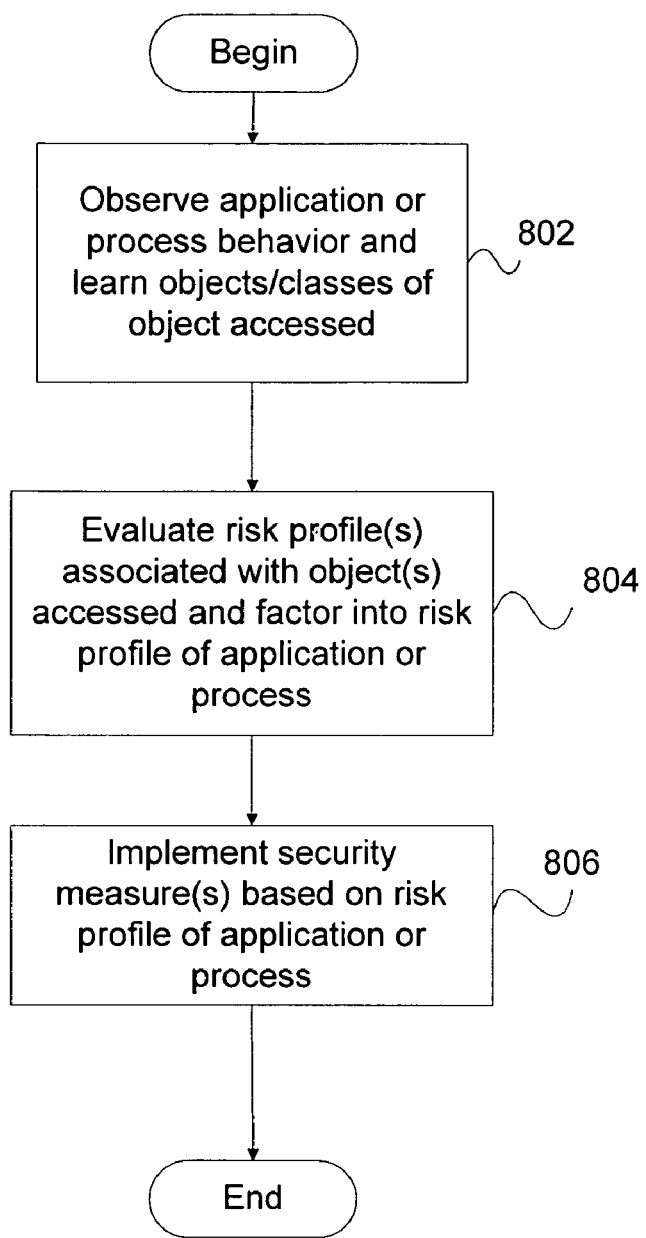
FIG. 8 is a flow chart of a process used in one embodiment to determine the risk profile of a service, application, or other process based on the interaction of the service, application, or process with stored objects during an observation period.

FIG. 8 is a flow chart of a process used in one embodiment to determine the risk profile of a service, application, or other process based on the interaction of the service, application, or process with stored objects during an observation period. The behavior of the service, application, or process is observed to learn the objects and/or classes of objects accessed by the service, application, or process (802). The object risk profile(s) associated with the objects accessed by the service, application, or process are evaluated and factored in to the risk profile associated with the service, application, or process (804). Security measures are implemented based on the risk profile associated with the service, application, or process (806).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for securing a process comprising:
   determining, using at least one computer processor, a level of risk associated with a first process, the level of risk based at least in part on static analysis of an executable file of the first process that identifies inter-process communication capabilities of the first process;
   receiving, using at least one computer processor, from the first process a request to access an object stored in computer readable memory, wherein receiving the request to access an object stored in computer readable memory comprises receiving a copy of the request sent by the first process to a destination other than a receiving destination;
   accessing an object risk profile of the object, the object risk profile comprising data indicating a level of risk of a second process that previously created or modified the stored object;
   determining whether the level of risk of the object risk profile is greater than the level of risk of a process risk profile of the first process;
   in the event that the level of risk of the object risk profile is greater than the level of risk of the process risk profile of the first process updating the process risk profile of the first process to reflect said level of risk reflected in the object risk profile; and
   deploying automatically, based at least in part on the updated process risk profile, a security measure to protect the first process.

2. The method as recited in claim 1, further comprising creating the object risk profile at the time the object is created and including in the object risk profile data indicating a level of risk of the second process that created the object.

3. The method as recited in claim 2, further comprising updating the object risk profile each time a service, application, or other process modifies the object to reflect the level of risk of the modifying service, application, or other process.

4. The method as recited in claim 2, further comprising updating the object risk profile each time a service, application, or other process accesses the object to reflect the level of risk of the accessing service, application, or other process.

5. The method as recited in claim 4, wherein updating the object risk profile comprising adding data of the accessing service, application, or other process to a log reflecting corresponding data for each service, application, or other process that has accessed the stored object.

6. The method as recited in claim 4, wherein updating the object risk profile comprising combining data of the accessing service, application, or other process with data already in reflected in the object risk profile to determine a consolidated level of risk for the object that reflects the level of risk of the highest risk service, application, or other process that has accessed the stored object.

7. The method as recited in claim 1 further comprising creating and maintaining an object risk profile for each stored object created or modified by a service, application, or other process having a prescribed characteristic.

8. The method as recited in claim 1, further comprising creating and maintaining an object risk profile for each stored object created or modified by a service, application, or other process running as system or root.

9. The method as recited in claim 1, further comprising creating and maintaining an object risk profile for each stored object created or modified by a service, application, or other process that communicates via one or more external ports.

10. The method as recited in claim 1, wherein the extent to which one or more security measures are deployed is determined dynamically based at least in part on the level of risk of the object or objects with which the requesting service, application, or other process has interacted most recently.

11. The method as recited in claim 1, further comprising factoring into the process risk profile the respective object risk profiles of the objects or classes of objects with which the requesting service, application, or other process interacted during an observation period and wherein the extent to which one or more security measures are deployed is determined statically based at least in part on the level of risk of the object or objects with which the requesting service, application, or other process interacted during the observation period.

12. The method as recited in claim 1, wherein the object risk profile is stored in a data structure separate from but associated with the location in which the stored object is stored.

13. The method as recited in claim 1, wherein the process risk profile is updated to equal the object risk level if the level of risk reflected in the object risk profile is higher than a current level of risk reflected in the process risk profile.

14. The method as recited in claim 1, wherein receiving from a first service, application, or other process a request to access an object stored in memory further comprises receiving a copy of a file system call sent by the first process to an operating system associated with the object stored in memory.

15. The method as recited in claim 1, wherein the object risk profile reflects a level of risk associated with a directory in which the object is stored.

16. A system for securing a process comprising:
a processor configured to:
determine a level of risk associated with a first process, the level of risk based at least in part on static analysis of an executable file of the first process that identifies inter-process communication capabilities of the first process;
receive from the first process a request to access an object stored in memory, wherein receiving from the first process the request to access an object stored in computer readable memory comprises receiving a copy of the request sent by the first process to a destination other than the receiving destination;
access an object risk profile of the object, the object risk profile comprising data indicating a level of risk associated with a second process that previously created or modified the stored object;
determine whether the level of risk of the object risk profile is greater than the level of risk of a process risk profile of the first process;
in the event that the level of risk of the object risk profile is greater than the level of risk of the process risk profile of the first process update the process risk profile of the first process to reflect said level of risk reflected in the object risk profile; and
deploy automatically, based at least in part on the updated process risk profile, a security measure to protect the first process; and
a memory configured to provide instructions to the processor.

17. The system as recited in claim 16, wherein the processor is further configured to create the object risk profile at the time the object is created and include in the object risk profile data indicating a level of risk of the second process that created the object.

18. The system as recited in claim 16, wherein the processor is further configured to create and maintain an object risk profile for each stored object created or modified by a service, application, or other process having a prescribed characteristic.

19. The system as recited in claim 16, wherein the extent to which one or more security measures are deployed is determined dynamically based at least in part on the level of risk associated with the object or objects with which the requesting service, application, or other process has interacted most recently.

20. The system as recited in claim 16, wherein the processor is further configured to factor into the process risk profile the respective object risk profiles of the objects or classes of objects with which the first process interacted during an observation period and wherein the extent to which one or more security measures are deployed is determined statically based at least in part on the level of risk associated with the object or objects with which the first process interacted during the observation period.

21. A computer program product for securing a process, the computer program product being embodied in a non-transitory computer readable storage medium and comprising computer instructions which when executed by a computer cause the computer to perform the steps of:
determining a level of risk associated with a first process, the level of risk based at least in part on static analysis of an executable file of the first process that identifies inter-process communication capabilities of the first process;
receiving from the first process a request to access an object stored in memory, wherein receiving from the first process the request to access an object stored in computer readable memory comprises receiving a copy of the request sent by the first process to a destination other than the receiving destination;
accessing an object risk profile of the object, the object risk profile comprising data indicating a level of risk associated with a second process that previously created or modified the stored object;
determining whether the level of risk of the object risk profile is greater than the level of risk of a process risk profile of the first process;
in the event that the level of risk of the object risk profile is greater than the level of risk of the process risk profile of the first process, updating the process risk profile of the first process to reflect said level of risk reflected in the object risk profile; and
deploying automatically, based at least in part on the updated process risk profile, a security measure to protect the first process.

22. The computer program product as recited in claim 21, further comprising computer instructions for creating the object risk profile at the time the object is created and including in the object risk profile data indicating a level of risk associated with the service, application, or other process that created the object.

23. The computer program product as recited in claim 21, further comprising computer instructions for updating the object risk profile each time a service, application, or other process accesses the object to reflect the level of risk associated with the accessing service, application, or other process.

24. The computer program product as recited in claim 21, further comprising computer instructions for creating and maintaining an object risk profile for each stored object created or modified by a service, application, or other process having a prescribed characteristic.

25. The computer program product as recited in claim 21, wherein the extent to which one or more security measures are deployed is determined dynamically based at least in part on the level of risk associated with the object or objects with which the first process has interacted most recently.

26. The computer program product as recited in claim 21, further comprising computer instructions for factoring into the process risk profile the respective object risk profiles associated with the objects or classes of objects with which the first process interacted during an observation period and wherein the extent to which one or more security measures are deployed is determined statically based at least in part on the level of risk associated with the object or objects with which the first process interacted during the observation period.

27. The method of claim 1, further comprising:
   setting a priority code for the first process, the priority code indicating an order in which a security measure for the first service, application, or other process is invoked.

28. The method of claim 1, wherein the first process comprises at least one of a service and an application.

* * * * *